(12) United States Patent
Denz et al.

(10) Patent No.: US 6,361,071 B1
(45) Date of Patent: Mar. 26, 2002

(54) GAS BAG FOR A VEHICULAR OCCUPANT RESTRAINT SYSTEM

(75) Inventors: Stefan Denz, Bad Säckingen; Norbert Lang, Leinzell, both of (DE)

(73) Assignee: TRW Occupant Restraint Systems GmbH & Co. KG, Aldorf (DE)

(*) Notice: Subject to any disclaimer, the term of this patent is extended or adjusted under 35 U.S.C. 154(b) by 0 days.

(21) Appl. No.: 09/718,169

(22) Filed: Nov. 21, 2000

Related U.S. Application Data

(62) Division of application No. 09/084,707, filed on May 26, 1998, now Pat. No. 6,170,860.

(30) Foreign Application Priority Data

May 28, 1997 (DE) ..................................... 297 09 389 U

(51) Int. Cl.⁷ ............................................. B60R 21/28
(52) U.S. Cl. ..................................... 280/739; 280/743.1
(58) Field of Search ............................ 280/729, 730.2, 280/736, 739, 743.1, 743.2; 139/389

(56) References Cited

U.S. PATENT DOCUMENTS

| | | | |
|---|---|---|---|
| 3,792,873 A | * 2/1974 | Buchner et al. | 280/743.1 |
| 5,094,477 A | * 3/1992 | Togawa | 280/743 |
| 5,098,125 A | 3/1992 | Thornton et al. | 280/743 |
| 5,240,283 A | 8/1993 | Kishi et al. | 280/729 |
| 5,338,061 A | 8/1994 | Nelson et al. | 280/729 |
| 5,393,092 A | 2/1995 | Charns et al. | 280/743.1 |
| 5,421,610 A | 6/1995 | Kavanaugh et al. | 280/743.1 |
| 5,524,926 A | 6/1996 | Hirai et al. | 280/743.1 |
| 5,536,038 A | 7/1996 | Bollaert et al. | 280/730.2 |
| 5,570,900 A | 11/1996 | Brown | 280/729 |
| 5,586,782 A | 12/1996 | Zimmerman et al. | 280/730.2 |
| 5,618,595 A | 4/1997 | Matsushima et al. | 428/35.2 |
| 5,634,659 A | * 6/1997 | Abraham | 280/739 |
| 5,713,598 A | 2/1998 | Morita et al. | 280/743.1 |
| 5,884,937 A | 3/1999 | Yamada | 280/730.2 |
| 5,927,754 A | 7/1999 | Patzelt et al. | 280/739 |
| 5,941,564 A | 8/1999 | Acker | 280/743.2 |
| 5,957,487 A | 9/1999 | Stutz | 280/730.2 |
| 6,056,316 A | * 5/2000 | Yamaji et al. | 280/730.2 |
| 6,170,860 B1 | * 1/2001 | Denz et al. | 280/730.2 |

FOREIGN PATENT DOCUMENTS

| | | |
|---|---|---|
| DE | 4430412 | 10/1995 |
| EP | 0687596 | 12/1995 |
| EP | 0875426 | 3/1998 |
| GB | 2318767 | 5/1998 |

* cited by examiner

Primary Examiner—J. J. Swann
Assistant Examiner—David R. Dunn
(74) Attorney, Agent, or Firm—Tarolli, Sundheim, Covell, Tummino & Szabo L.L.P.

(57) ABSTRACT

A gas bag for a vehicular occupant restraint system comprises two plies of fabric partially interwoven along their outer edges. To offer protection over a lengthy period in time amounting to several seconds but nevertheless dissipate the energy of impact to the required degree on impact and cushioning of the occupant, the plies of fabric are substantially air-tight, and the volume of the gas bag is divided by partial interweaving of the plies of fabric within the outer edges into several chambers. Further, the chambers are interconnected by at least one choked port remaining between the portions of the interwoven plies of fabric. Only part of the chambers is directly inflated by an inflator, the remaining part of the chambers being indirectly inflated via the choked port.

2 Claims, 4 Drawing Sheets

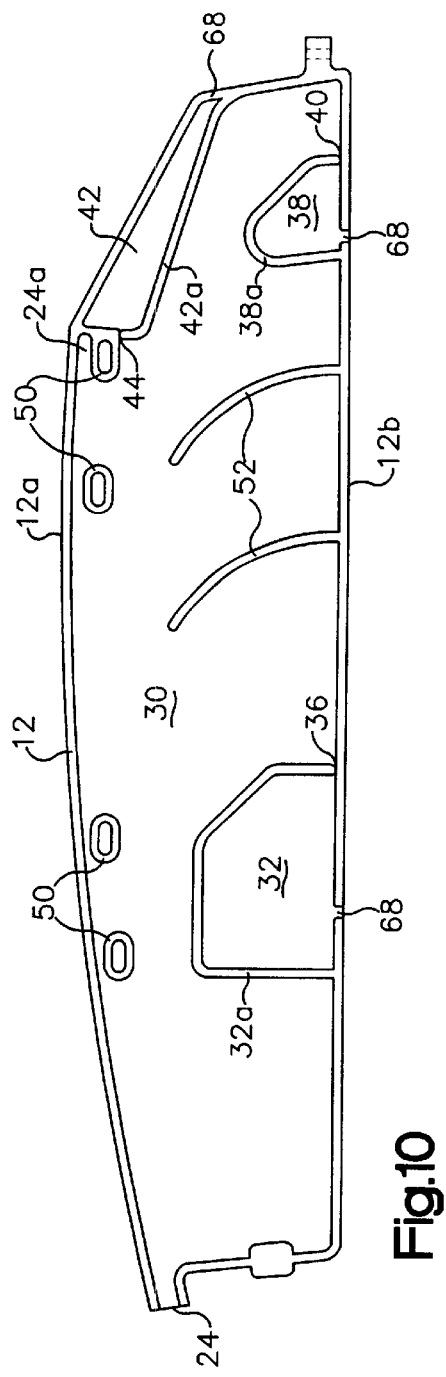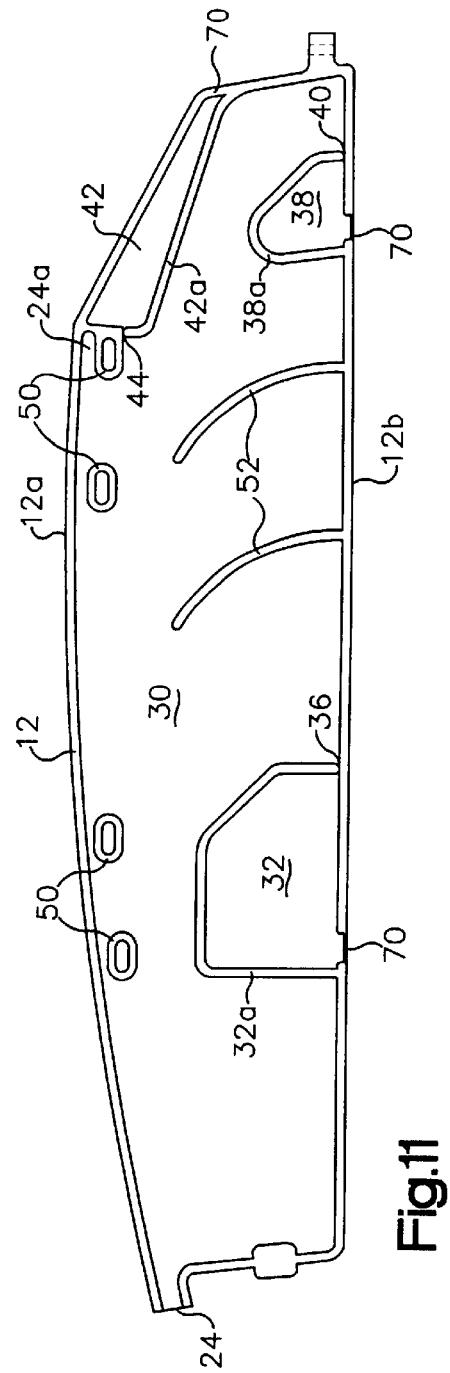

GAS BAG FOR A VEHICULAR OCCUPANT RESTRAINT SYSTEM

This application is a divisional of application Ser. No. 09/084,707, filed on May 26, 1998 now U.S. Pat. No. 6,170,860.

FIELD OF THE INVENTION

The invention relates to a gas bag for a vehicular occupant restraint system comprising two plies of fabric partially interwoven along their outer edges.

BACKGROUND OF THE INVENTION

For producing a generally cushion-shaped, inflatable gas bag two pieces of textile material having the same shape may be joined to each other along their outer edges. Connecting the two pieces of textile material together along their outer edges is usually done by stitching, it also being possible, however, to produce the connection of two plies of fabric by interweaving them to form a sole web of material at the connecting surface area. Such a gas bag may be produced by the Jacquard weave.

When the occupant impacts the inflated gas bag and is subsequently cushioned thereby the intended energy dissipation is achieved by a controlled escape of the gas filling the gas bag. In but a few tens of a millisecond after impact the gas has already escaped almost totally from the gas bag. Should a follow-on impact occur or should the vehicle topple the gas bag is unable to offer any more protection.

SUMMARY OF THE INVENTION

The invention provides a gas bag for a vehicular occupant restraint system offering protection over a lengthy period in time amounting to several seconds which nevertheless dissipates the energy of impact to the required degree on impact and cushioning of the occupant. For this purpose the gas bag has several special features. For one thing, the plies of fabric comprising it are essentially air-tight. For another, its volume is divided into several chambers by partially interweaving the plies of fabric within the outer edges. These chambers are interconnected by at least one choked port remaining between the portions of the interwoven plies of fabric. Finally, only part of the chambers is directly inflated by an inflator, the remaining part of the chambers is indirectly inflated via the choked port. By interweaving the two plies of fabric along their outer edges an air-tight connection is achieved. Since the plies of fabric themselves are essentially air-tight the gas bag is in all air-tight to such a degree that it can provide cushioning for up to several seconds. Since dividing the gas bag into several chambers is also achieved by interweaving the plies of fabric the gas-tightness of the gas bag is not affected, unlike the usual connecting technique by stitching.

On activation of the restraint system initially only part of the chambers of the gas bag is inflated by an inflator, this being that part of the chambers which experience has shown to be expected to first come into contact with the body of the occupant. When the occupant impacts the gas bag the gas inflating it is displaced from the chambers first inflated. Via the choked passage the gas is then able to flow into the remaining chambers. The resistance to flow of the choked passage is tuned to the desired response in energy dissipation. In the case of a complex crash seqence, especially when toppling of the vehicle is involved, and when the gas bag is employed for side impact protection in the head region the occupant may impact the gas bag multiply at various positions. In this situation the gas inflating the gas bag is displaced from the chamber impacted by the occupant into the remaining chambers.

BRIEF DESCRIPTION OF THE DRAWINGS

Further features and advantages of the invention will be appreciated from the following description with reference to the drawings in which:

FIGS. 10 and 11 show two further embodiments of a gas bag.

DESCRIPTION OF THE PREFERRED EMBODIMENTS

Figure 1:
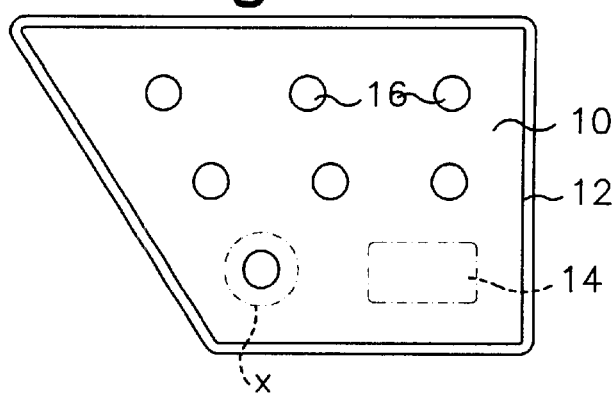
FIG. 1 is a schematic plan view of a deployed gas bag for side impact protection in the head region.
Figure 2:
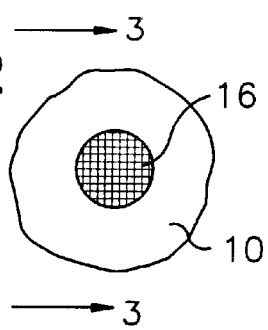
FIG. 2 is a section view of FIG. 1 on a magnified scale.

The gas bag 10 shown deployed and extended in FIG. 1 consists of two superimposed plies of fabric which are interwoven along their outer edges 12. One of the two plies of fabric features an inflation orifice 14 for connection to an inflator. Within the outer edges 12 the two plies of fabric are joined together at several connecting points 16 by weaving. Both the outer edges 12 and the connecting points 16 form an air-tight finish due to being interwoven. The plies of fabric themselves are essentially air-tight. The degree of air-tightness is determined by view of the intended cushioning duration of the inflated gas bag. To achieve the necessary gas-tightness the following methods of treatment come into consideration either singly or in combination:

- washing the interwoven textile blanks to activate hydroshrinkage:
- drying to activate thermoshrinkage;
- coating the interior surface fully or partly.

Figure 3:
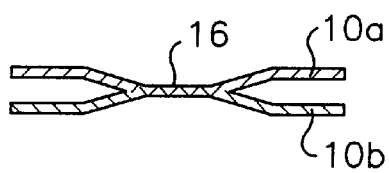
FIG. 3 is a section view along the line III—III in FIG. 2.

As apparent from FIG. 3 the two plies of fabric 10a, 10b are intimately compounded at the connecting points 16 to form a single web of fabric. Due to the connecting points 16 the volume of the gas bag 10 as a whole is divided into several chambers. These chambers are interconnected via choked ports remaining between the connecting points 16.

Figure 4:
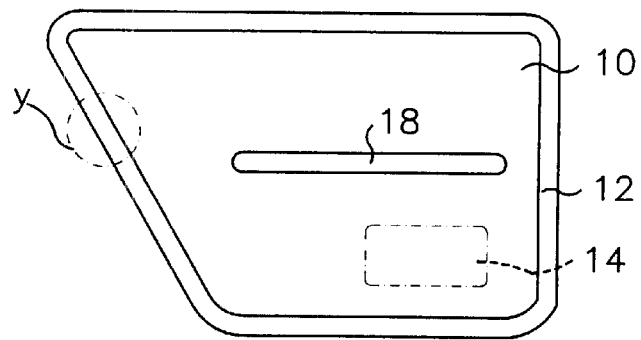
FIG. 4 is a side view of a modified embodiment of the gas bag.

The embodiment shown in FIG. 4 differs from that shown in FIG. 1 merely in the division of the gas bag volume. By an elongated connecting strip 18 the gas bag volume is divided into an upper and a lower chamber. Between the ends of the connecting strip 18 and the outer edges 12 a choked port is formed in each case between the chambers.

Figure 5:
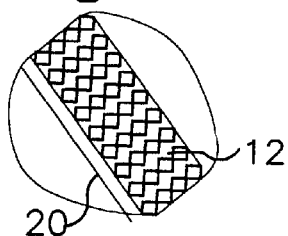
FIG. 5 is detail view taken from FIG. 4 shown on a magnified scale.

As apparent from the detail view in FIG. 5 the cutting line 20 along which the interwoven blanks of the gas bag are cut off the fabric is placed outside of the outer edges 12, thus avoiding a weakening of the compounding along the outer edges 12.

The aspects of the gas bag shown in FIGS. 1 to 5 are provided for head protection in case of side impact.

Figure 6:
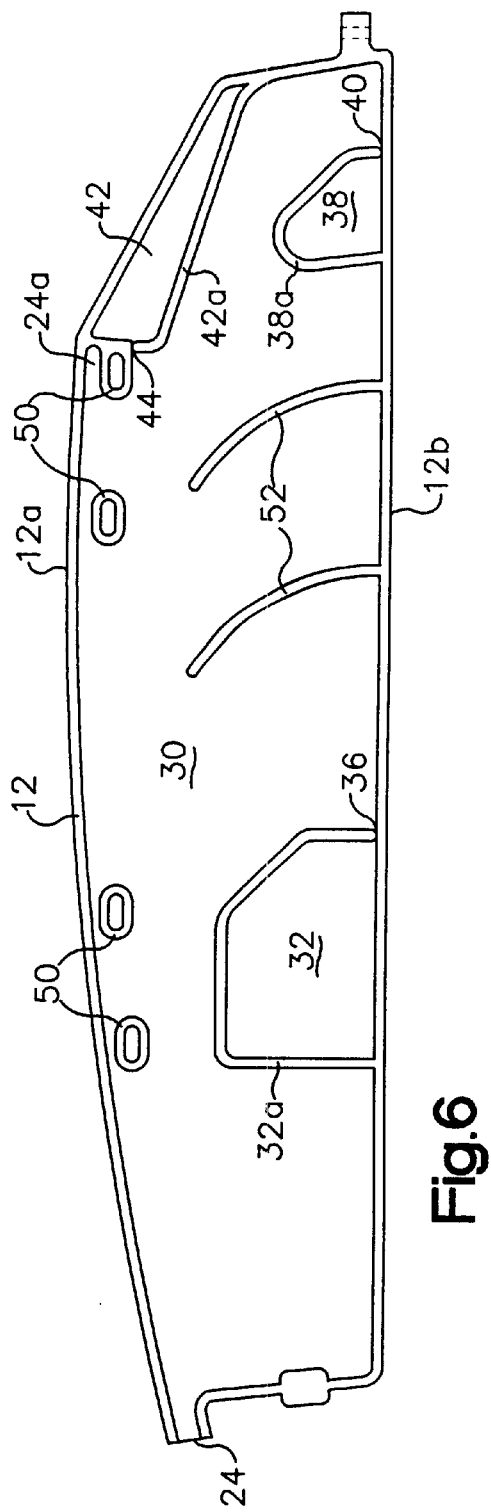
FIG. 6 is a plan view of a deployed gas bag covering the windows of a vehicle from the A pillar to the C pillar and effectively providing head protection in the case of a side impact.

The embodiment of the gas bag shown in FIG. 6 consists in turn of two superimposed plies of fabric interwoven partially along their outer edges 12. In all, these plies of fabric have an elongated shape since the gas bag in its deployed condition is tensioned between the A pillar and the C pillar to cover the side windows of the vehicle for head protection in case of side impact. Whilst the upper edge 12a is curved to conform with the roof curvature of the vehicle, the lower edge 12b extends in a straight line. Between the rear end of the upper edge 12a and the upswept rear end of the lower edge 12b an insertion orifice 24 for a tubular diffusor or the like is formed which extends up to a pocket 24a in the front region below the upper edge 12a. The volume of the gas bag is divided into several chambers. The outer edge 12 defines an elongated main chamber 30. A second, substantially smaller chamber 32 is defined in the rear region of the gas bag between the lower edge 12b and a hem 32a emanating from the latter at right angles, this hem extending over roughly half the height of the gas bag before being swept down right-angled to the front and then running at an angle downwards before finally ending perpendicular in the vicinity of the lower edge 12b. Between the end of the hem 32a and the lower edge 12b a choked port 36 is formed between the chambers 30 and 32. Along the hems 32a the two sandwiched plies of fabric are interwoven.

In a similar way a third chamber 38 is defined in the vicinity of the front end of the gas bag by the lower edge 12b and a hem 38a. Between the main chamber 30 and the third chamber 38 a choked port 40 is in turn provided.

A fourth chamber 42 is formed at the front end of the gas bag between the upper edge 12a and a hem 42a. This chamber 42 has the shape of an elongated triangle and is connected via a choked port 44 to the main chamber 30.

The two plies of fabric are furthermore interwoven slightly spaced away from the upper edge 12a along several annularly closed hems 50. These hems 50, which preferably are elongated in shape, serve to define a through-opening for fasteners, more particularly, fastener screws or the like.

Within the main chamber 30 of the gas bag two curved hems 52, emanating from the lower edge 12b, are provided, extending up to beyond half the height of this main chamber 30. These hems mainly serve shaping the gas bag when inflated. The hems 32a, 38a and 42a too, contribute towards shaping the gas bag; their primary function being, however, to define the chambers 32, 38 and 42 from the volume of the main chamber 30. Whilst the main chamber 30 is directly inflated via the tubular diffusor inserted through the orifice 24 when activated, the chambers 32, 38 and 42 are indirectly inflated via the choked ports 36, 40 and 44.

Figure 7:
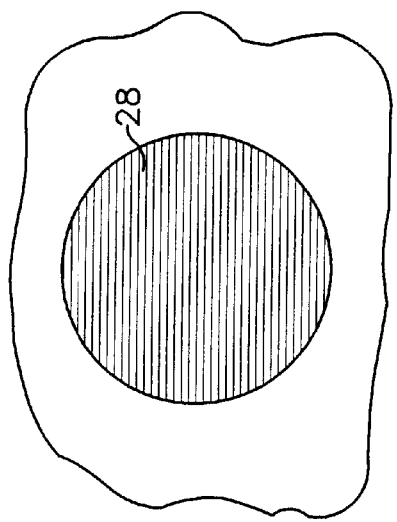
FIG. 7 is a schematic illustration of a gas exit port having a filtering effect.

FIG. 7 shows a possible configuration of a gas exit port 28 in one of the plies of fabric. In the embodiment shown this gas exit port 28 is contoured circularly. Within this contour warp and weft threads are freely floated. In this way a filtering effect is achieved simultaneously with the localized gas permeability desired.

Figure 8:
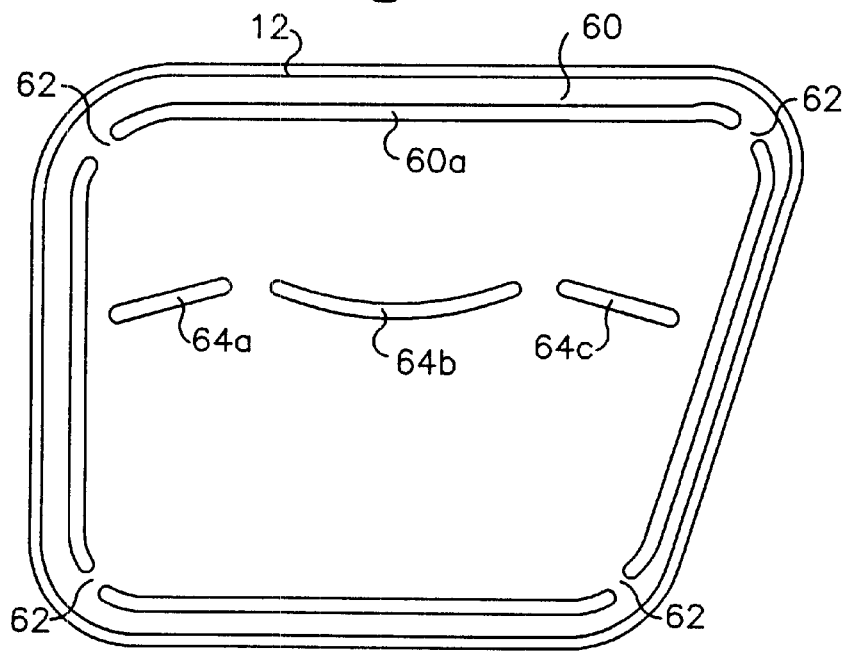
FIGS. 8 and 9 show two further embodiments of a gas bag.
Figure 9:
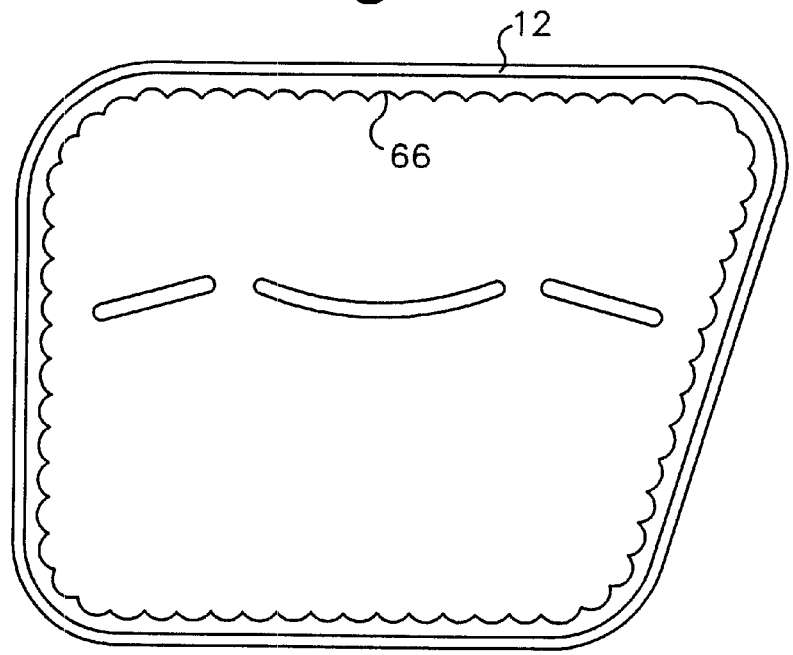

The embodiments of the gas bag shown in FIGS. 8 and 9 serve side impact in the head and thorax region, they extending in the activated condition from the A pillar to the B pillar or from the B pillar to the C pillar in a configuration similar to that of the embodiments shown in FIGS. 1 and 5, but with a few special features.

In the embodiment shown in FIG. 8, extending within the outer edges 12 parallel thereto, is a narrow annular chamber 60 which is defined by a hem 60a. This annular chamber 60 is connected at each of the four corners of the gas bag to the internal volume of the gas bag by a choked port 62. Slightly above the middle height of the gas bag its two plies of fabric are interwoven along three hems 64a, 64b, 64c. These hems 64a, 64b and 64c serve substantially to shape the gas bag by defining its deployment transversely to the planes of the plies of fabric.

The special feature of the embodiment shown in FIG. 9 consists of the outer edges 12, along which the two plies of fabric of the gas bag are interwoven, comprising on the inside a corrugated contour 66. Due to this corrugated contour an improved distribution of loading between warp and weft threads is achieved.

FIG. 10 shows an embodiment of the gas bag, which is substantially similar to the embodiment shown in FIG. 6. The gas bag shown only differs in that three gas exit ports are formed in the outer edges 12 by a respective interruption 68 of the fabric compound between the plies of fabric. By means of these gas exit ports a specific leakage of the gas bag is caused and on inflation of the gas bag as well as on impact of an occupant the pressure within the gas bag is prevented from rising too high.

The embodiment of the gas bag shown in FIG. 11 is also substantially similar to the embodiment shown in FIG. 6. For preventing the pressure within the gas bag from rising too high, e.g. on inflation or on impact of an occupant, three predetermined breaking sites are formed in the outer edges 12, which break open at a predetermined pressure within the gas bag, thereby enabling gas to escape from the gas bag. In the region of the predetermined breaking sites, a weakening of the fabric compound between the plies of fabric is achieved by only partly interweaving the threads being positioned within the area of the outer edges, e.g. 5 to 10 threads.

What is claimed is:

1. A gas bag for a vehicular occupant restraint system comprising two plies of fabric partially interwoven along their outer edges, wherein:

said plies of fabric are substantially air-tight;

the volume of the gas bag is divided by partial interweaving of said plies of fabric within said outer edges, thereby forming a plurality of chambers;

remaining portions of the interwoven plies of fabric defining between them at least one choked port interconnecting said chambers;

a first part of said chambers being directly inflatable by an inflator, and a second part of said chambers being indirectly inflatable via said choked port;

the gas bag further comprises at least one gas exit port being formed seamlessly in one of said plies of fabric by floating warp and weft threads of said one of said plies of fabric.

2. A gas bag for a vehicular occupant restraint system comprising two plies of fabric partially interwoven along their outer edges, wherein:

said plies of fabric are substantially air-tight;

the volume of the gas bag is divided by partial interweaving of said plies of fabric within said outer edges, thereby forming a plurality of chambers;

remaining portions of the interwoven plies of fabric defining between them at least one choked port interconnecting said chambers;

a first part of said chambers being directly inflatable by an inflator, and a second part of said chambers being indirectly inflatable via said choked port;

the gas bag further comprising at least one gas exit port being formed seamlessly and exclusively by a portion in said outer edges of said plies of fabric where said plies are not interwoven.

* * * * *